United States Patent
Hoffman

(10) Patent No.: US 6,727,680 B2
(45) Date of Patent: Apr. 27, 2004

(54) EXTENDED RANGE POWER SUPPLY SYSTEM

(75) Inventor: Michael Hoffman, Amery, WI (US)

(73) Assignee: Dynatronix, Inc., Amery, WI (US)

( * ) Notice: Subject to any disclaimer, the term of this patent is extended or adjusted under 35 U.S.C. 154(b) by 0 days.

(21) Appl. No.: 10/455,582

(22) Filed: Jun. 5, 2003

(65) Prior Publication Data

US 2003/0206420 A1 Nov. 6, 2003

Related U.S. Application Data

(63) Continuation of application No. 09/967,245, filed on Sep. 28, 2001, now abandoned.
(60) Provisional application No. 60/236,219, filed on Sep. 28, 2000, and provisional application No. 60/237,270, filed on Sep. 28, 2000.

(51) Int. Cl.$^7$ ................................................ G05F 1/40
(52) U.S. Cl. ................................................ 323/269
(58) Field of Search ................................ 323/268, 269, 323/271–277

(56) References Cited

U.S. PATENT DOCUMENTS

| | | | | |
|---|---|---|---|---|
| 5,060,131 A | * | 10/1991 | Sikora | 363/97 |
| 5,675,480 A | * | 10/1997 | Stanford | 307/58 |
| 5,818,670 A | * | 10/1998 | Ahn | 361/18 |
| 6,088,246 A | | 7/2000 | Okuyama et al. | |
| 6,097,614 A | | 8/2000 | Jain et al. | |
| 6,215,290 B1 | * | 4/2001 | Yang et al. | 323/282 |
| 6,456,512 B1 | | 9/2002 | Chen | |
| 6,525,947 B2 | * | 2/2003 | Umetsu et al. | 363/21.15 |

* cited by examiner

Primary Examiner—Matthew V. Nguyen
(74) Attorney, Agent, or Firm—Skinner and Associates

(57) ABSTRACT

An extended range power supply system includes a power source for providing operational power with a power supply circuit connecting with the power source for regulating the operational power. A current sensing circuit is connected with the power supply circuit, the current sensing circuit including a plurality of current sensing elements, each sensing element configured for a selected output range, with each sensing element individually operatively activated, and each sensing element providing a feedback signal. A control loop compensation circuit is connected with the current sensing circuit for receiving the feedback signal and with the power supply circuit to provide an error signal. The control loop compensation circuit includes a like plurality of control loop compensation components, each operatively associated with one current sensing element for receiving a feedback signal. Activation of one current sensing element and an associated control loop compensation component for a desired output current range provides for optimum performance of the power supply at the selected peak output current range.

17 Claims, 1 Drawing Sheet

EXTENDED RANGE POWER SUPPLY SYSTEM

CROSS-REFERENCE TO RELATED APPLICATIONS, IF ANY

This application is a continuation of U.S. patent application Ser. No. 09/967,245, filed Sep. 28, 2001, now abandoned, which is hereby incorporated by reference This application also claims the benefit under 35 U.S.C. §119(e) of provisional applications Serial No. 60/236,219, filed Sep. 28, 2000 and 60/237,270, filed Sep. 28, 2000, which are hereby incorporated by reference.

37 C.F.R. §1.71(e) AUTHORIZATION

A portion of the disclosure of this patent document contains material, which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to power supply apparatus and methods. More particularly, the invention relates to an extended range variable power supply. The invention has particular utility in pulse plating power supplies.

2. Background Information

The deposition of metal on a substrate using direct current is a well-known technology used in a number of metal finishing industries, especially the electronics industry. A recent advance in this technology is the pulsing of direct current during the plating process. This innovation provides a series of pulses of direct current (D.C.), of equal amplitude and duration in the same direction, or alternating directions, separated by periods of zero current. The pulse rate (frequency) and ON and OFF times (duty cycle) are controllable to meet the requirements of a given application. The pulses are routinely employed at a rate of 500 to 10,000 times per second. This plating method favors the initiation of grain nuclei and significantly increases the number of grains per unit area. The resulting metal coating is a finer grain deposit with better characteristics and properties than conventionally plated coatings. The pulse plating technology has become a requirement in the electronics industry where the process and/or product specification are highly restrictive and sophisticated.

In addition to the composition of the liquid phase containing soluble metal salts, which are the source of the deposited metal(s), a critical component of the system is the regulated power supply that delivers pulsed current to the substrate. Many power supply devices and methods for their operation are know, but are believed to have significant limitations and shortcomings. The performance of pulse and pulse reversing power supplies presently used for electroplating is limited by the requirement to satisfy a wide spectrum of load conditions while maintaining output stability. This requirement limits the operational range in which these power supplies deliver optimal performance in current or voltage regulation modes. The optimal operating range for these devices is from about 5% to about 100% of the peak rated current output capability of the power supply. For this and other reasons, a need exists for the present invention.

The invention provides an extended range power supply, which is believed to fulfill the need and to constitute an improvement over the background technology.

All US patents and patent applications, and all other published documents mentioned anywhere in this application are incorporated by reference in their entirety.

BRIEF SUMMARY OF THE INVENTION

The present invention provides an extended range power supply system. In one embodiment, the apparatus includes a power source for providing operational power with a power supply circuit connecting with the power source for regulating the operational power. A current sensing circuit is connected with the power supply circuit, the current sensing circuit including a plurality of current sensing elements, each sensing element configured for a selected output range, with each sensing element individually operatively activated, and each sensing element providing a feedback signal. The current sensing circuit is connected with, and supplies current to, a load. A control loop compensation circuit is connected with the current sensing circuit for receiving the feedback signal and with the power supply circuit to provide an error signal. The control loop compensation circuit includes a like plurality of control loop compensation components, each operatively associated with one current sensing element for receiving a feedback signal. Activation of one current sensing element and an associated control loop compensation component for a desired output current range provides for optimum performance of the power supply at the selected peak output current range.

Significant features of the invention include optimal performance through an output range of 0.1% to 100% of peak rated output current for a pulse/pulse reversing power supply system.

The features, benefits and objects of this invention will become clear to those skilled in the art by reference to the following description, claims, and schematic drawings.

DETAILED DESCRIPTION

Figure 1:
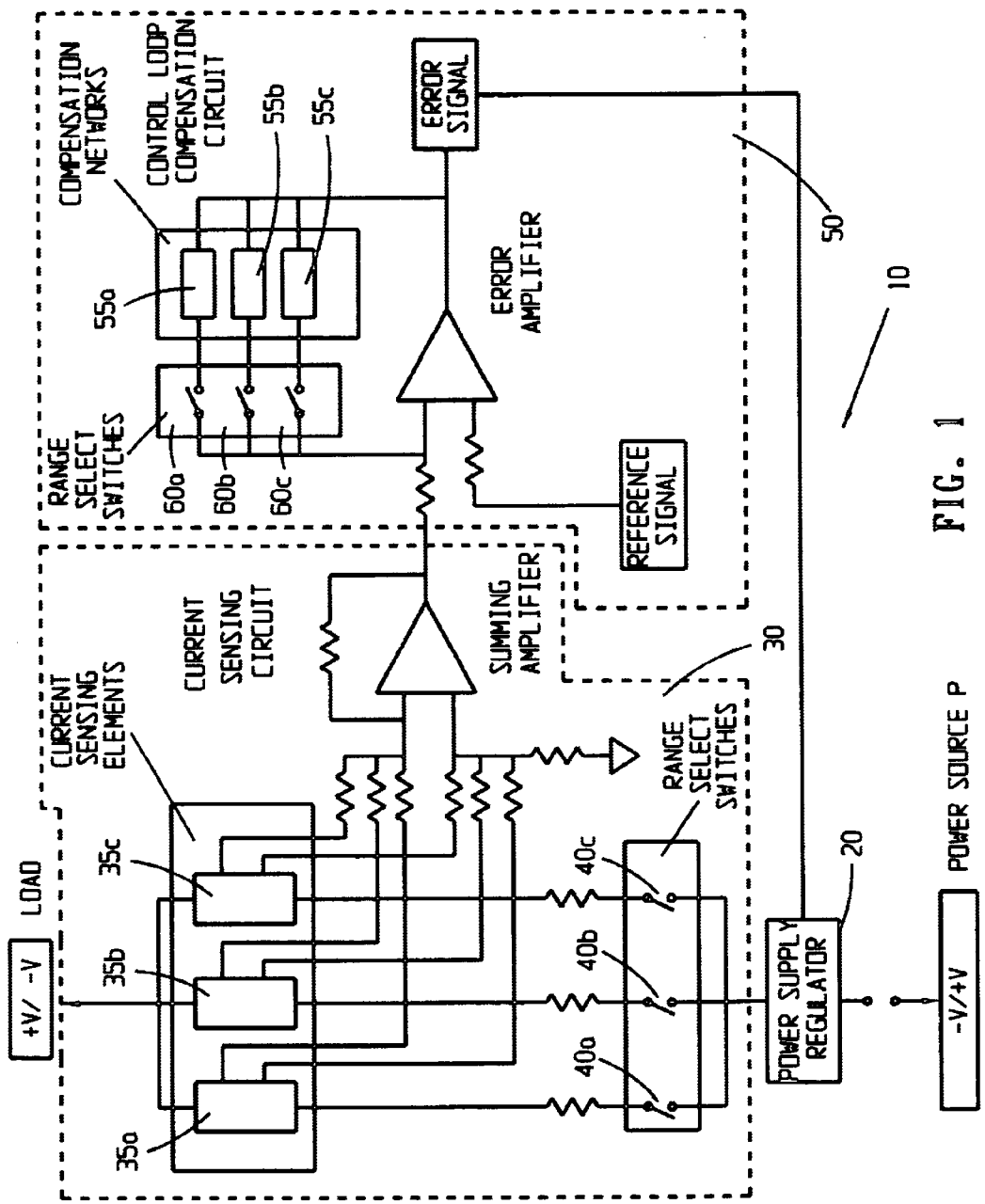
FIG. 1 is a block schematic diagram of one embodiment of the present invention.

The present invention provides a pulse or pulse reversing power supply that delivers optimal performance through a broad, current regulated, operating range. The power supply device of the present invention provides optimal performance through an output range of 0.1% to 100% of the peak rated output current of the device. The present invention provides a power supply device including current sensing circuitry having a plurality of current sensing elements incorporated therein. Based upon the portion of the output range selected for operation, one of the current sensing elements is operatively activated to monitor power for the selected output range. Each current sensing element is configured for a selected output range, (i.e. 0.1% to 0.99%, 1.00% to 9.99%, or 10.0% to 100%). Further, the current sensing elements provide a feedback signal that is proportionally larger for the sensing element monitoring the lower output ranges.

In addition, the power supply device of the present invention includes a like plurality of control loop compensation components, each operatively associated with one current sensing element. The selection of one current sensing element and associated control loop compensation component for the desired output current range provides for optimum performance of the power supply at that selected peak output current range to a load, such as a plating cell.

FIG. 1 show an embodiment of the present invention, generally indicated by the reference numeral 10. The extended range power supply system 10 is described below first in terms of its major structural elements and then in terms of its secondary structural and/or functional elements which cooperate to perform the extended range power supply function.

Referring to FIG. 1, one embodiment of the extended range power supply system 10 is shown in block schematic diagram form. The extended range power supply system 10 is interposed between a power source P providing operational power and a load L, such as a plating cell. The system 10 includes a power supply regulator 20 connected to the power source P. In one embodiment of the present invention, the regulating power supply circuit 20 includes semiconductor devices arranged in a series pass, linear regulation scheme. The semiconductor devices may include MOSFETs, bipolar junction transistors or similar devices that are well known in the industry.

A current sensing circuit 30 is connected between the power supply regulator 20 and the load L. The current sensing circuit 30 includes a plurality of current sensing elements 35a, 35b, 35c, each configured for a selected output range. Each current sensing element 35a, 35b, 35c, is operatively activated individually by an associated range selection switch 40a, 40b, 40c, respectively. In this embodiment, three current sensing elements 35a, 35b, 35c are employed, with each current sensing element providing a feedback signal when operational. The current sensing elements 35a, 35b, 35c, of the current sensing circuit 30 each includes a resistive element, including a kelvin connection, for sensing a voltage drop resulting from current passing there through.

A control loop compensation circuit 50 is connected with the current sensing circuit 30 for receiving the feedback signal from the current sensing elements 35a, 35b, and 35c, of the current sensing circuit 30. The control loop compensation circuit 50 includes a like plurality of control loop compensation components 55a, 55b, 55c, each operatively associated with one current sensing element 35a, 35b, 35c, for receiving a feedback signal from the current sensing circuit 30. The compensation component 55a, 55b, 55c, of the control loop compensation circuit 50 may include a capacitive element, a capacitive element connected in series with a resistive element, or a capacitive element connected in parallel with series connected capacitive and resistive elements.

Each control loop compensation component 55a, 55b, 55c, is operatively activated individually by an associated range switch 60a, 60b, 60c. The two sets of range selector switches, 40a–40c and 60a–60c, are controlled so that switches 40a and 60a close simultaneously to operatively associate current sensing element 35a with control loop compensation component 55a. Likewise, pairs of switches 40b and 60b close simultaneously, as do pairs of switches 40c and 60c, to operatively associate each current sensing element with the appropriate control loop compensation component.

The control loop compensation circuit 50 provides an error signal that is transmitted to the power supply regulator 20 to regulate the power supply 20, thereby providing optimal performance of the power supply 20 at the selected peak output current range selected. In a further embodiment of the invention, a first current sensing element monitoring a first output current of a lower range, for example, about 0.1% to 0.99% peak output, provides a first feedback signal of about an equal magnitude as a third feedback signal from a third current sensing element monitoring a higher output current range, for example, about 10.0% to 100% peak output current.

The descriptions above and the accompanying drawings should be interpreted in the illustrative and not the limited sense. While the invention has been disclosed in connection with an embodiment or embodiments thereof, it should be understood that there may be other embodiments, which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A pulse/pulse reversing power supply system providing optimal performance through an output range of 0.1% to 100% of peak rated output current comprising;
   (a) a power source for providing operational power;
   (b) a power supply circuit connecting with the power source for regulating the operational power;
   (c) a current sensing circuit connecting with the power supply circuit, the current sensing circuit including a plurality of current sensing elements, each sensing element configured for a selected output range, each sensing element operatively activated individually, each sensing element providing a feedback signal, the current sensing circuit connecting with, and supplying current to, a load; and
   (d) a control loop compensation circuit connecting with the current sensing circuit for receiving the feedback signal and connecting with the power supply circuit to provide an error signal thereto, the control loop compensation circuit including a like plurality of control loop compensation components, each compensation components operatively associated with one current sensing element for receiving a feedback signal; whereby activation of one current sensing element and an associated control loop compensation component for a desired output current range provides for optimum performance of the power supply at the selected peak output current range.

2. The pulse/pulse reversing power supply system according to claim 1, wherein the regulating power supply circuit includes semiconductor devices arranged in a series pass, linear regulation scheme.

3. The pulse/pulse reversing power supply system according to claim 1, wherein the current sensing circuit includes three current sensing elements.

4. The pulse/pulse reversing power supply system according to claim 3, wherein a first current sensing element is configured for about 0.1% to 0.99% peak output current, a second current sensing element is configured for about 1.00% to 9.99% peak output current, and a third current sensing element is configured for about 10.0% to 100% peak output current.

5. The pulse/pulse reversing power supply system according to claim 4, wherein a first current sensing element monitoring a first output current range of about 0.1% to 0.99% peak output current, provides a first feedback signal of a magnitude essentially equal to a third feedback signal from a third current sensing element monitoring a third output current range of about 10.0% to 100% peak output current.

6. The pulse/pulse reversing power supply system according to claim 1, wherein the control loop compensation circuit includes three control loop compensation components.

7. The pulse/pulse reversing power supply system according to claim 6, wherein a first control loop compensation component is associated with a first current sensing element, a second control loop compensation component is associated with a second current sensing element, and a third control loop compensation component is associated with a third current sensing element.

8. The pulse/pulse reversing power supply system according to claim 1, wherein each current sensing element includes a resistive element, including a kelvin connection, for sensing a voltage drop resulting from current passing there through.

9. The pulse/pulse reversing power supply system according to claim 1, wherein the control loop compensation circuit includes a component selected from the group a capacitive element, a capacitive element connected in series with a resistive element, and a capacitive element connected in parallel with series connected capacitive and resistive elements.

10. A pulse/pulse reversing power supply system providing optimal performance through an output range of 0.1% to 100% of peak rated output current comprising;
    (a) a power source for providing operational power;
    (b) a power supply circuit connecting with the power source for regulating the operational power;
    (c) a current sensing circuit connecting with the power supply circuit, the current sensing circuit including at least three current sensing elements, each sensing element configured for a selected output range, each sensing element operatively activated individually, each sensing element providing a feedback signal, the current sensing circuit connecting with, and supplying current to, a load; and
    (d) a control loop compensation circuit connecting with the current sensing circuit for receiving the feedback signal and connecting with the power supply circuit to provide an error signal thereto, the control loop compensation circuit including at least three control loop compensation components, each compensation components operatively associated with one current sensing element for receiving a feedback signal; whereby activation of one current sensing element and an associated control loop compensation component for a desired output current range provides for optimum performance of the power supply at the selected peak output current range.

11. The pulse/pulse reversing power supply system according to claim 10, wherein the regulating power supply circuit includes semiconductor devices arranged in a series pass, linear regulation scheme.

12. The pulse/pulse reversing power supply system according to claim 10, wherein a first current sensing element is configured for about 0.1% to 0.99% peak output current, a second current sensing element is configured for about 1.00% to 9.99% peak output current, and a third current sensing element is configured for about 10.0% to 100% peak output current.

13. The pulse/pulse reversing power supply system according to claim 12, wherein a first current sensing element monitoring a first output current range of about 0.1% to 0.99% peak output current, provides a first feedback signal of a magnitude essentially equal to a third feedback signal from a third current sensing element monitoring a third output current range of about 10.0% to 100% peak output current.

14. The pulse/pulse reversing power supply system according to claim 10, wherein a first control loop compensation component is associated with a first current sensing element, a second control loop compensation component is associated with a second current sensing element, and a third control loop compensation component is associated with a third current sensing element.

15. The pulse/pulse reversing power supply system according to claim 10, wherein each current sensing element includes a resistive element, including a kelvin connection, for sensing a voltage drop resulting from current passing there through.

16. The pulse/pulse reversing power supply system according to claim 10, wherein the control loop compensation circuit includes a component selected from the group a capacitive element, a capacitive element connected in series with a resistive element, and a capacitive element connected in parallel with series connected capacitive and resistive elements.

17. A method for providing optimal performance for a pulse/pulse reversing plating system comprising the steps;
    (a) providing a power supply system including;
        (i) a power source for providing operational power;
        (ii) a power supply circuit connecting with the power source for regulating the operational power;
        (iii) a current sensing circuit connecting with the power supply circuit, the current sensing circuit including a plurality of current sensing elements, each sensing element configured for a selected output range, each sensing element operatively activated individually, each sensing element providing a feedback signal, the current sensing circuit connecting with, and supplying current to, a load; and
        (iv) a control loop compensation circuit connecting with the current sensing circuit for receiving the feedback signal and connecting with the power supply circuit to provide an error signal thereto, the control loop compensation circuit including a like plurality of control loop compensation components, each compensation components operatively associated with one current sensing element for receiving a feedback signal;
    (b) connecting the power supply system to a plating cell;
    (c) activating one current sensing element and an associated control loop compensation component for a desired output current range, thereby providing optimum performance of the power supply at the selected peak output current range; and
    (d) operating the pulse/pulse reversing plating system for a selected duration to effect plating of a component in the plating cell.

* * * * *